United States Patent [19]

Barnich et al.

[11] Patent Number: 4,525,601

[45] Date of Patent: Jun. 25, 1985

[54] TELEPHONE CALL ACCOUNTING SYSTEM

[76] Inventors: Richard G. Barnich, 6197 Hereford Rd., Saline, Mich. 48176; Michael H. Ferguson, 1455 Marlborough; Charles K. McGregor, both of Ann Arbor, Mich. 48104

[21] Appl. No.: 561,154

[22] Filed: Dec. 13, 1983

[51] Int. Cl.³ .................... H04M 15/16; H04M 15/32
[52] U.S. Cl. ................................ 179/7 MM; 179/11; 179/7 R
[58] Field of Search .................. 179/11, 10, 9, 8, 7 R, 179/7 M

[56] References Cited

U.S. PATENT DOCUMENTS 4,090,034  5/1978  Moylan .............................. 179/7 R Primary Examiner—Stafford D. Schreyer
Attorney, Agent, or Firm—Krass & Young

[57] ABSTRACT

A computer based telephone accounting system collects data on calls made from a key system or PBX and automatically generates accounting reports which include the costs of the calls. A minimum amount of memory is used in calculating the costs by grouping combinations of area codes and exchange numbers into geographic bands and precomputing the distance from a particular area code and exchange number to all the remaining combinations of area codes and exchange numbers in the other bands. The combination of area codes and exchange numbers are stored in an N×M memory matrix where N equals the area code numbers and M equals the exchange numbers. A plurality of memory stored, multi-bit data words defining an algorithm for computing the cost of a call to a particular band are individually selected using an address defined by the position of the bit in the memory matrix which corresponds to the particular area code/exchange number being called. A programmed computer calculates the cost of a call using a memory stored rate table and the selected algorithm.

13 Claims, 11 Drawing Figures

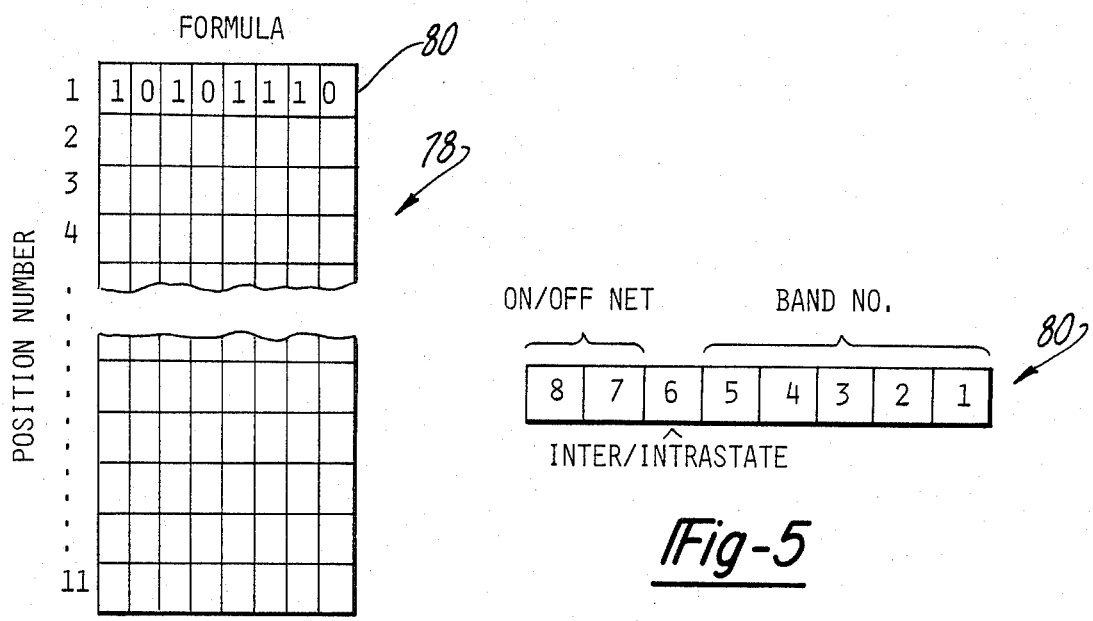
*Fig-4*
*Fig-5*
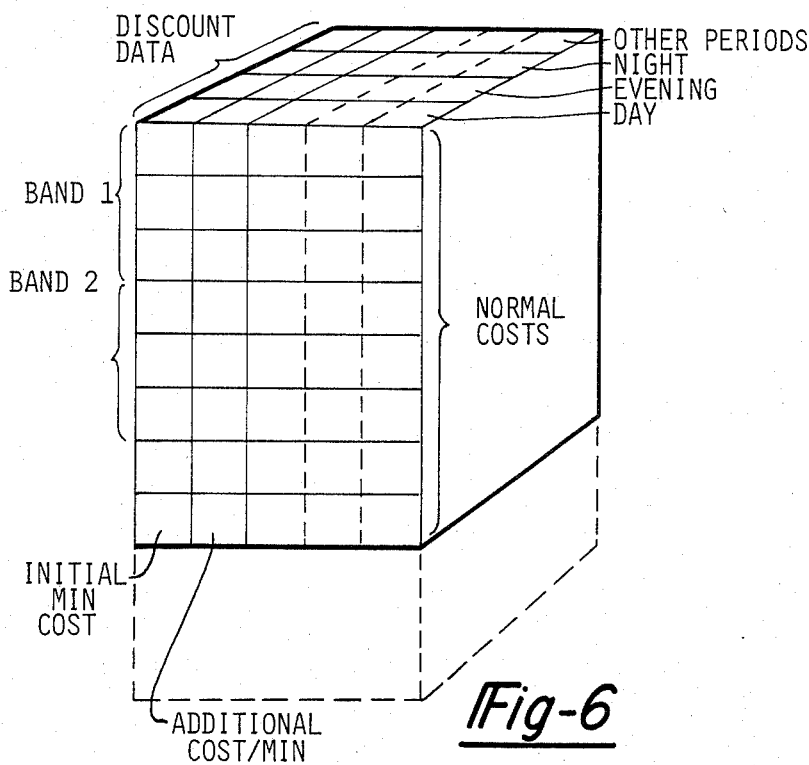
*Fig-6*
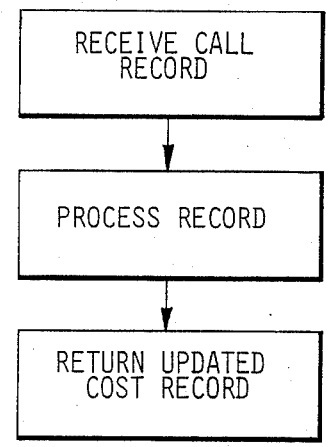
*Fig-7*

TELEPHONE CALL ACCOUNTING SYSTEM

DESCRIPTION

1. Technical Field

The present invention broadly relates to telephone systems, and deals more particularly with a method and apparatus for costing and recording telephone calls in key of PBX telephone systems.

2. Background Art

The use of telephone systems for conducting business has escalated rapidly during the last few years, particularly in connection with telephone transmission of digital data.

As the result of the higher usage of telephone systems, and attendant increases in costs, cost control and reporting of telephone calls has become more important. Costing telephone calls is complicated by the large number of combinations of area codes and exchange numbers, the various rate schedules which take into consideration the time of the day and the day of the week that the call is made, and the type of the call; i.e., WATS (Wide Area Telephone Service), OCC (other common carrier), DDD (direct distance dialing), and FX (Facsimile).

Automatic reporting systems have been devised in the past, particularly for use with PBX's (private branch exchange). PBX's generate SMDR data (station message detail recording) which itemizes information about each call that is made from the PBX. The SMDR data, which is typically 80 to 90 characters long, is delivered to an RS232 output port which drives a printer or other output to record or store the information. The data typically includes the time of day, the date, the duration of the call, the number that was dialed, the extension that was involved, and in some cases, account codes to allow tracing to a specific account.

Known prior art accounting systems calculate the cost of telephone calls based on the distance between the calling and receiving location. The price of a call is calculated by multiplying the mileage times the rate for the particular call times appropriate discounts. The mileage is calculated using a V X H coordinate system wherein each combination of an area code and exchange number has a vertical and horizontal coordinate assignment; in other words, an X and Y coordinate value. The X value corresponds to the location of the telephone set placing the call, while the Y value corresponds to the location of the telephone set receiving the call. The mileage is calculated by measuring the distance between the X and Y coordinates using the sum of the squares technique. This approach to calculating the costs is not only time consuming because of the calculations which must be made, but also requires considerable memory since there are 96,000 different possible area code and exchange number combinations in the United States. Each area code/exchange number combination requires storage of a vertical and horizontal coordinate which requires four bytes, consequently, almose 4000,000 bytes of storage would be required to store the conventional V X H mileage coordinate system.

Thus, it is apparent that it would be advantageous to provide a telephone call accounting system which requires considerably less memory capacity and which eliminates the need for complicated and time consuming mathematical computations.

BRIEF SUMMARY OF THE INVENTION

According to the present invention, a computer based telephone call accounting system collects data on calls made from a key system of PBX and automatically produces accounting reports listing the cost of the calls as well other information including the time and date of the call, the number dialed, etc. The format and content of the reports may be varied using software. The call data is stored in memory until the user requests a hard copy printout of the reports. When the amount of accumulated call data reaches a preset percentage of the capacity of the system's memory, the system automatically prints out the stored data and purges the system, clearing the memory to receive additional call data into storage. The system substantially reduces the amount of memory capacity necessary to cost the calls by grouping area codes/exchange number combinations into geographic bands and then precomputing the distance from the particular area code and exchange number in which the system is to be used to all of the remaining telephone sets in the other bands. The area code/exchange number combinations are stored in an N X M memory matrix where N equals the area codes and M equals the exchange numbers. A plurality of multi-bit words defining algorithms for computing particular distances are stored in a memory and are individually selected using an address defined by the position of the bit in the memory matrix which corresponds to the area code/exchange number being called. The computer program calculates the cost of calls using a memory stored rate table and one of the selected algorithms.

BRIEF DESCRIPTION OF THE DRAWINGS

In the drawings, which form an integral part of the specification and are to be read in conjunction therewith, and in which like reference numerals are employed to designate identical components in the various views:

FIG. 4 is a diagrammatic view of a memory in which algorithm numbers are stored for use in calculating the cost of a call;

FIG. 5 is a diagrammatic view of one of the data words stored in the memory shown in FIG. 4, FIG. 6 is a perspective, diagrammatic view of a memory in which call rate data is stored;

FIG. 7 is a flow chart showing the broad steps for processing call data;

DETAILED DESCRIPTION OF THE SPECIFIC EMBODIMENTS

Figures 1, 3:
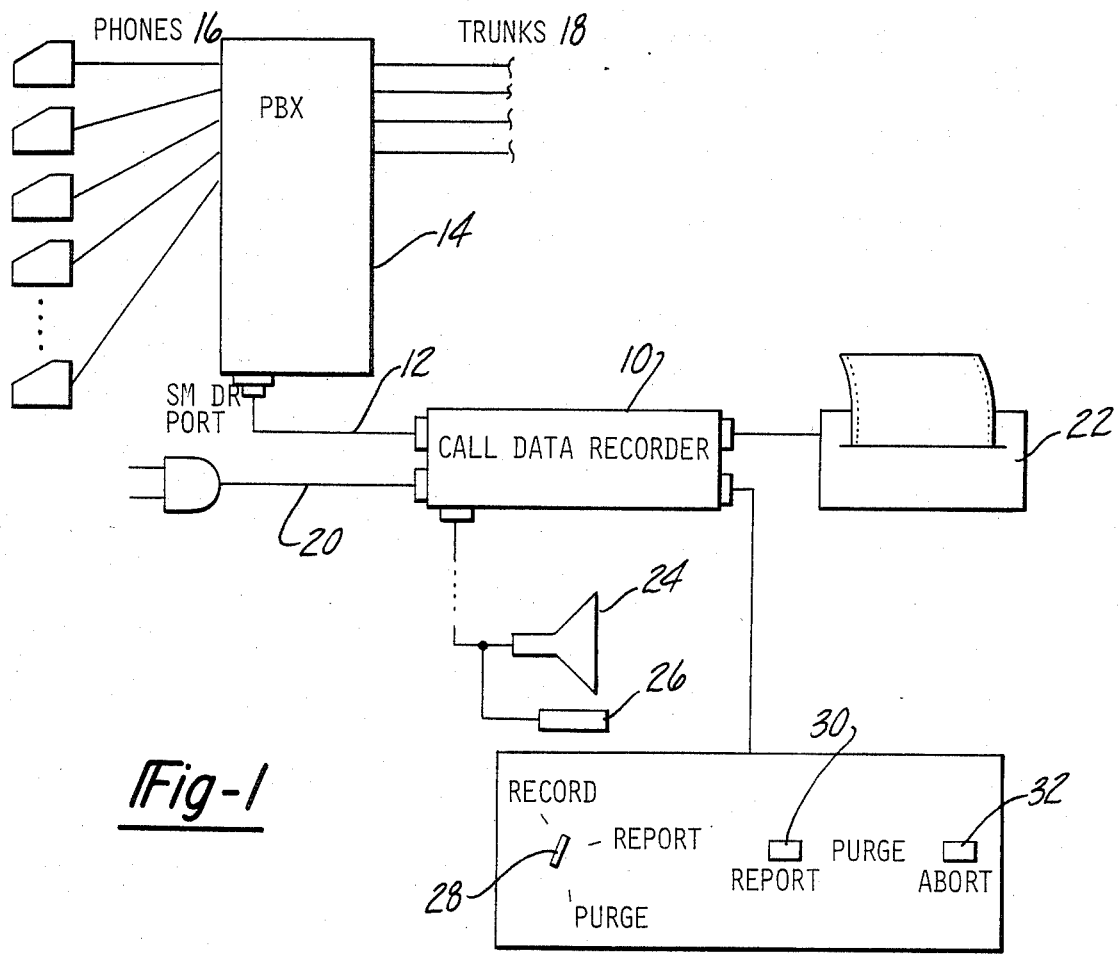
FIG. 1 is a diagrammatic view of the telephone call accounting system of the present invention shown in relation to a PBX whose calls are being monitored.
FIG. 3 is a diagrammatic view of the arrangement of an N X M memory matrix in which bits are stored corresponding to combinations of area codes and exchange numbers.

Referring first to FIG. 1, the present invention broadly involves a telephone call accounting system in which accounting reports are generated for calls placed from either a key type telephone or a PBX (private branch exchange) 14 to any telephone set in a telephone exchange system. The PBX 14 includes a plurality of phone sets 16 which are connected with outgoing trunk lines 18 forming part of the exchange system.

The PBX includes an SMDR (station message detailed recording port) which is normally connected to a printer or the like and provides a data record of each call that is made from the PBX. Each record may consist of 80 to 90 serial characters which identify the time of the day, the date, the duration of the call, the number that was dialed, the extension that was involved, and in some cases, account codes.

A call data recorder 10 includes an input line 12 connected to the SMDR port of the PBX and is adapted to receive, process, and store each call record output by the PBX 14. The call data recorder 10 is powered by a suitable source of 110 volt AC delivered by a wall plug line 20 although it also could be optionally powered by the standard 48 volt d.c. which powers the PBX 14. The recorder 10 includes a data output port which is connected to and drives a printer 22 for generating accounting reports. The recorder also includes a programming port which is connected to a CRT 24 and keyboard 26 which are employed to initially program and configure the recorder 10.

Recorder 10 includes a control panel on which there is provided a three postion selector switch 28 and report and abort pushbutton switches 30 and 32 respectively.

The operation of the call data recorder 10 will now be described following which the details of its construction and operating program will be disclosed in more detail. Call data recorder 10 is specifically configured and programmed for a customer having a particular area code and exchange number. The CRT 24 and keyboard 26 provides a convenient means of initially configuring the recorder 10. The configuration process involves determining what kind of reports are generated, the dates on which the reports are to be printed out, page titles, department names, a description of the trunk lines (WATS, MCI, SPRINT, DDD lines, etc.) Call rate data is also input and stored in the recorder 10 during the configuration phase. Following configuration, the CRT 24 and keyboard 26 are disconnected from the recorder 10 and the recorder 10 is installed on site for monitoring calls from the PBX 14. The recorder 10 receives the SMDR information on line 12, reformats the data and compresses and stores the data and checks for errors in the incoming data. If an error in the data is detected, a flag is set and the data is later recalled during the reporting phase for further scrutiny. In the event that the printer 22 is in the process of generating a report when an incoming call is received from the PBX 14, the reporting process is interrupted while the SMDR data is received and processed.

With the selector switch 28 in the run position, the report switch 30 may be actuated to produce a status report which is printed out in hard copy by the printer 22 and provides a status check of the accounting records. For example, the status report may indicate the name of the user and the revision level of the software, the capacity of the system in terms of calls and the amount of storage capacity remaining. The status report also indicates the time of the next scheduled report and the number of times that the recorder 10 has been disconnected from its power source.

The recorder 10 is programmed to automatically generate an accounting report at a particular time and date when the selector switch 20 is in the run position.

With the selector switch 28 is the report position, actuation of the report switch 30 results in the generation of a printed report, regardless of whether or not the preprogrammed reporting date has been reached. During the reporting process, all calls which have not been previously costed out are costed and a marker is set in a call record memory so that all calls received during the reporting process are stored and printed out on the next report. During the reporting process, actuation of the abort switch 32 terminates the reporting process.

Finally, with the selector switch 28 in the purge position, simultaneous actuation of the report and abort switches 30 and 32 respectively results in the purging of all call data from the recorder which has been previously reported.

Figure 2:
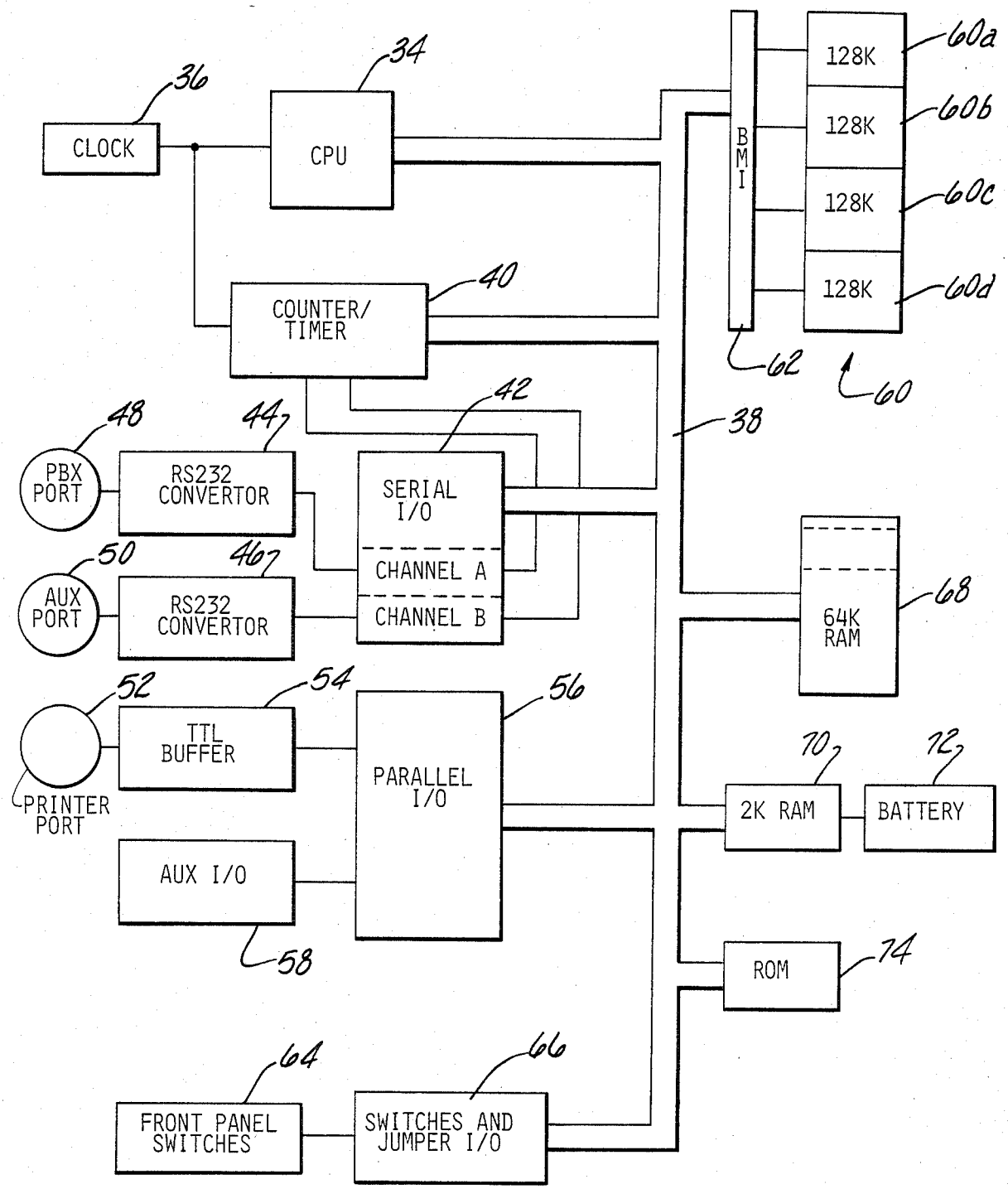
FIG. 2 is a block diagram of the computer system which forms an integral part of the call data recorder which forms a part of the accounting system.

Referring now to FIG. 2, the recorder 10 includes a computer system provided with a central processing unit (CPU) 34 which may consist of, by way of example, a Z80 microprocessor. CPU 34 and a counter/timer 40 are each connected to a data bus 38 and are driven in synchronism by a suitable clock source 36. The counter/timer 40 may consist of a type 3881 chip in which four independent counter/timers are provided. In the present application, two of the counter/timers are employed as baud rate generators, while the other two are used as general purpose timers. SMDR data on line 12 from the PBX 14 is received at a PBX port 48. The serial information from PBX port 48 is delivered through an RS232 convertor 44 to one channel ("A") of a serial input/output device 42. A second channel ("B") of device 42 receives data converted by RS232 convertor 46 which is derived from an auxiliary input port 50. Auxiliary port 50 is temporarily connected with the CRT 24 and keyboard 26 when the system is initially programmed and configured. The interface device 42 loads the data received at ports 48 and 50 onto the data bus 38 for processing.

Report data delivered on bus 38 is converted by a parallel input/output interface device 56 and delivered through a TTL buffer 54 to a printer port 52 which is connected with the printer 22. Interface device 56 may further include an auxiliary input/output 58 to which switches or jumpers may be connected for testing and troubleshooting the system. The front panel switches 64 on the recorder 10 (switches 28, 30, and 32 as well as any other switches or jumpers 66 integral to the recorder and used for testing of configuration, are also connected to the data bus 38.

A ROM 74 (read only memory) is connected to data bus 38 and contains from 2 K to 4 K bits of storage. ROM 74 is employed as a "phantom" ROM in which a program is stored which causes an operating program stored in a bubble memory 60 to be transferred via data bus 38 to a 64 K RAM 68. After the operating system is loaded, the ROM 74 is disconnected from the bus 38. A RAM 70 having approximately 2 K of storage is provided to temporarily store subtotals during data calculations and a battery 72 is provided to prevent memory loss in RAM 70 in the event of a power failure.

The bubble memory 60 includes four interconnected memory bubles 60a–60d which are connected with the data bus 38 by means of a bubble memory interface 62, which may comprise a 7200 series chip. Each of the memory bubbles 60a–60d contains 128 K bytes of storage, thus providing a total of 512 K bytes of memory.

Approximately 51 K bytes of the bubble memory 60 is employed to store algorithms for calculating the cost of calls and an additional 43 K bytes are used for storage of the operating program.

In practice 2 K bytes of RAM 70 overlay or replace 2 K bytes of the 64 K byte RAM 68. Power for the RAM 70 is provided by battery 72 during periods when system power is removed, thus providing 2 K bytes of "non-volatile" storage for critical variables, data, etc. Upon power-up of the system, ROM 74 overlays or replaces the lower 32 K bytes of RAM 68; this ROM contains programs to "boot" load the operating system from the bubble memory system 62, 60 a–d into RAM 68. When the operating system is loaded, the ROM 74 is switched out of the system and is replaced by the lower 32 K bytes of RAM 68.

Attention is now directed to FIGS. 3–6 which discloses a method by which calls are costed using programmed information stored in the bubble memory 60. 12 K of bubble memory 60 has stored therin a bit table 76 in which bits are stored which identifies a unique formula or algorithm to be used for calculating the mileage between a calling station and receiving station. The bit table 76 consists of an $N \times M$ array of storage locations in which N corresponds ot each of the area code numbers and M corresponds to each of the exchange numbers. A bit is loaded into only those storage locations which correspond to an actual, operating combination of an area code and exchange number. For those storage locations corresponding to an area code/exchange number combination which is not operating, a null value is entered. Presently, in the United States, for example, there are 121 different area codes and approximately 800 exchanges for each area code. When a particular call is being costed, the operating program first determines the position in a table of the particular area code/exchange number being called. Position may be easily determined by counting the number of vertical and horizontal storage locations to a reference point, normally the origin for upper left storage location (area code 201/exchange number 200.) For illustrative purposes, a position number has been assigned to each of the storage locations shown in the bit table 76, however it is to be understood that the program calculates the unique position of a particular storage location each time a call is costed.

Approximately 39 K of the bubble memory 60 has stored therein a plurality of 8 bits data words in the form of a column, each of which data word corresponds to an algorithm or a formula for costing a call to a particular area code and exchange number. Thus, the data words stored in the algorithm memory 78 are selected and addressed using a position number which is derived from the bit table 76. As shown in FIG. 5, each of the data words 80 consists of 8 bits of information, the five least significant bits of which identify the formula to be used to calculate the cost of a call to that area code/exchange. The sixth bit identifies whether the call is interstate or intrastate. Bit 6 is examined by the program only if the call is DDD (direct distance dial.) Bits 7 and 8 determine whether the call is on or off network for those calls made through other common carriers (e.g., MCI, SPRINT, etc.) Thus, each of the data words 80 may store one of 256 possible combinations or numbers in a single byte. Up to 32 of the 256 possible algorithms may be dedicated to calculating the cost of interstate calls is an exchange system having only ten interstate zones or bands. In those systems having more than 10 bands, the remaining number of algorithms are utilized.

After a particular algorithm has been selected using the postion number from the bit table 76, the program resorts to a look up table of rates shown in FIG. 6 which are stored in the 64 K RAM 68. The rate-table 82 contains the costs of making a call from the particular area code/exchange number for which the recorder 10 has been programmed, to the various bands for interstate calling as well as local calls, and as a function of both discounts which are given (day, evening, night, station to station) and the duration of the call. At this point, it may be appreciated that the foregoing method of costing telephone calls substantially reduces the amount of memory required to store mileage data by precomputing the distance of the call.

FIG. 7 depicts a flow chart showing the overall sequence of operations performed by the program in costing calls. Upon receipt of a call from the PBX 24, the call is stored in memory 68 and a record of the call is thereby created and is subsequently written to a file in the bubble memory 60. Next, the record of the call is processed, and if it is possible to cost out the call the costing is completed, otherwise costing is delayed until a later time. Following the costing process, a record is created in which the cost is stored until the cost data is printed out and the system is purged.

Figure 8:
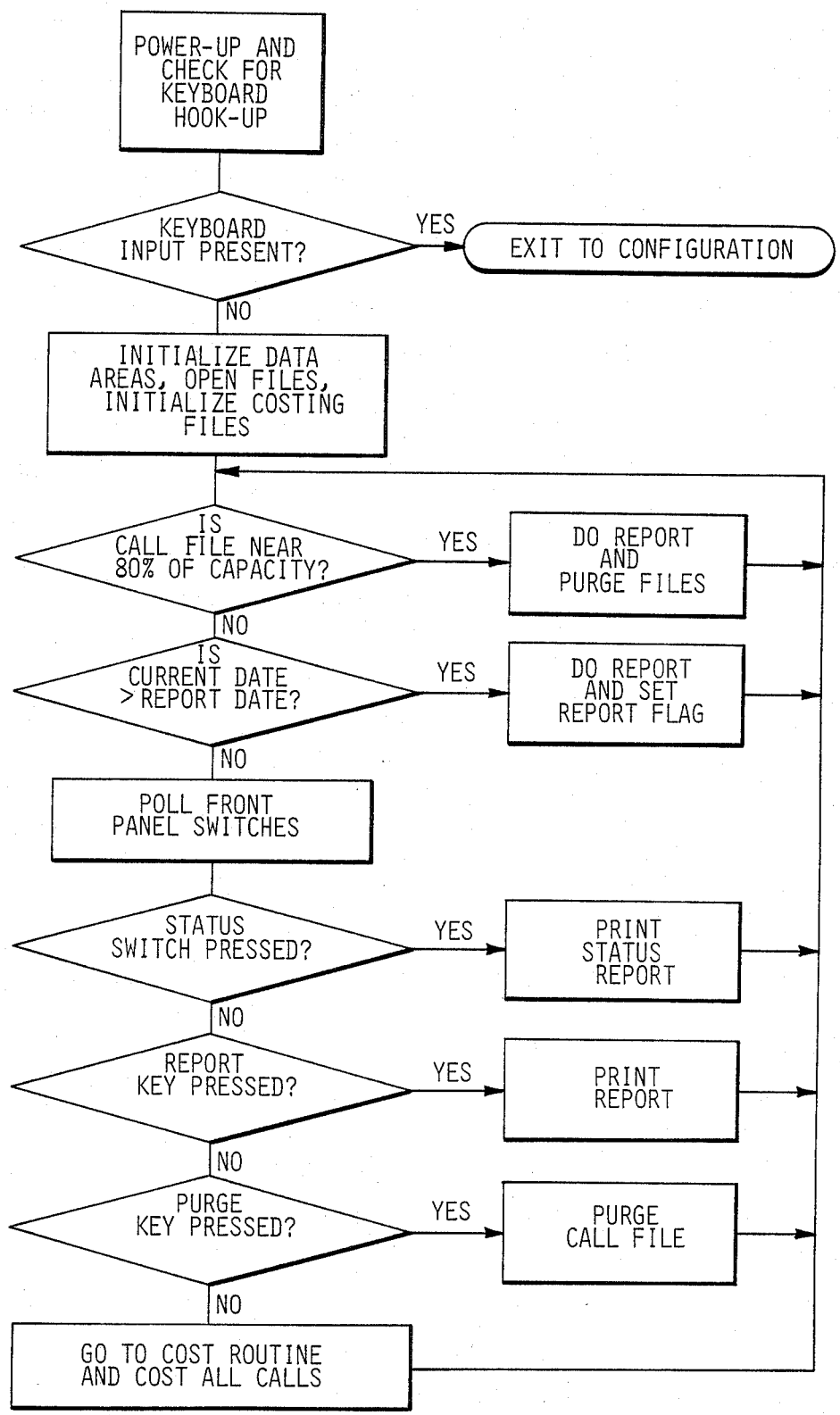
FIG. 8 is a flow chart for the main computer program for the system.

A flow chart of the main operating program is shown in FIG. 8 which will now be described. Initially, upon power up of the system, auxiliary port 50 is checked to determine whether the keyboard 26 is connected to the system. If the keyboard is present, control is transferred to a configuration program which permits programming the system to suit the needs of a particular user.

If a keyboard is not detected, indicating that the system has been previously configured and is ready for operation, the program initializes all data areas, opens files in preparation for the receipt of call data, and initializes costing files. The program then determines whether the call files are full or near their capacity. In the event that the call files have reached 80 percent of their capacity a report is automatically generated and printed out and all call files are purged. If the call files are less than 80 percent of their capacity, a determination is made as to whether the preprogrammed report date has been reached. If the report date has been reached, a cost report is generated and printed right out and a report flag is set. Assuming the report date has not been reached, the control switches 28, 30, and 32 are polled to determine their status. If the report switch 30 is operated with the selector 28 in the run position, a status report is generated. If selector 28 is in the report position when the report switch 30 is depressed a full set of reports will be generated and printed. If, however, switches 30 and 32 are depressed simultaneously with selector 28 in the purge position, the system will purge all previously reported calls. Assuming that none of the switches have been activated, the program switches control to a costing program which costs one call following which control is returned to the main program and the sequence of program steps commencing with the determination of the capacity of the call files is repeated.

Figure 9:
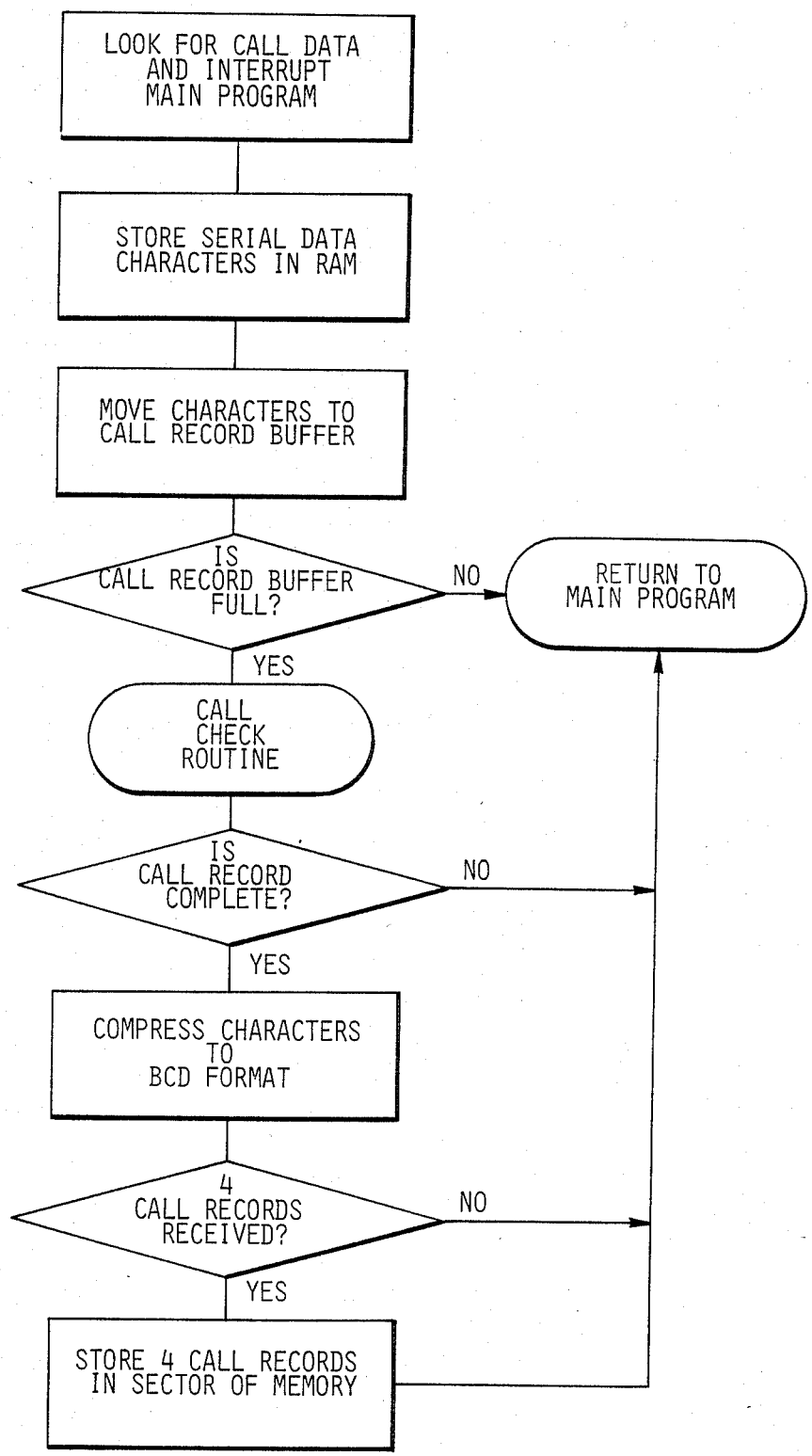
FIG. 9 is a flow chart for the interrupt routine.

Operating concurrently with the main program is an interrupt program, a typical flow chart for which is shown in FIG. 9. The interrupt program continuously looks for call data received at the PBX port 48 of the recorder 10 and functions to interrupt the main program in the event that a call is received. Upon receipt of a call, the serial data characters from the PBX 14 is stored in the RAM 68, following which the data characters are moved to a call record buffer. If the call record buffer is not full, control is returned to the main program. However, if the call record buffer is full the next routine is called up which determines if the call record is complete; i.e., does the call record include the proper number of characters arranged in the proper fields, etc. If the call record is not complete, control is returned to the main program. Assuming the call record is complete, the 80 to 90 characters of PBX data are converted to BCD format consisting of approximately 32 characters. The BCD is then stored in groups of four call records to a particular section of the bubble memory 60, then following which control is returned to the main program.

Figure 10:
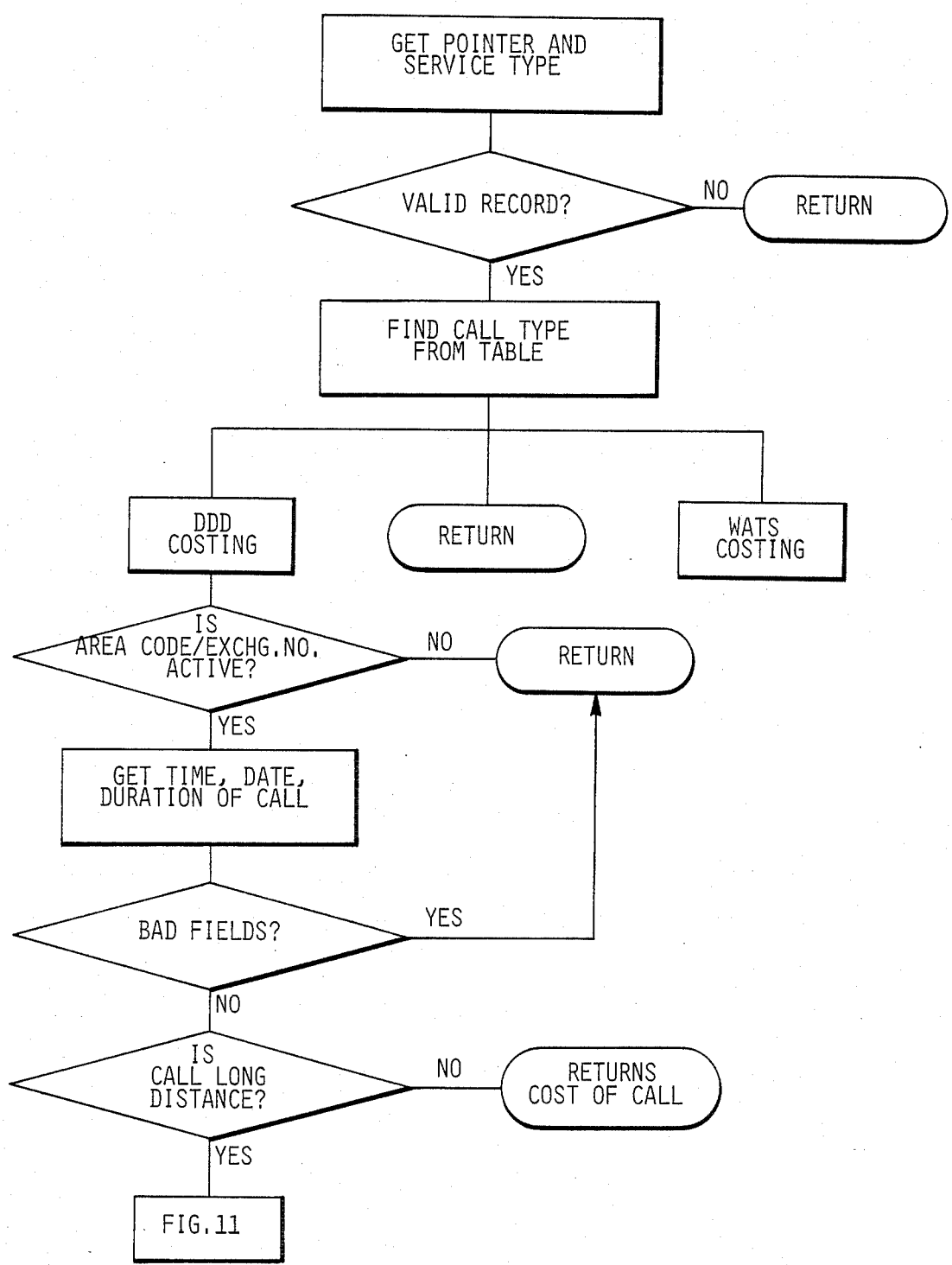
FIGS. 10 and 11 are flow charts for the cost routine.
Figure 11:
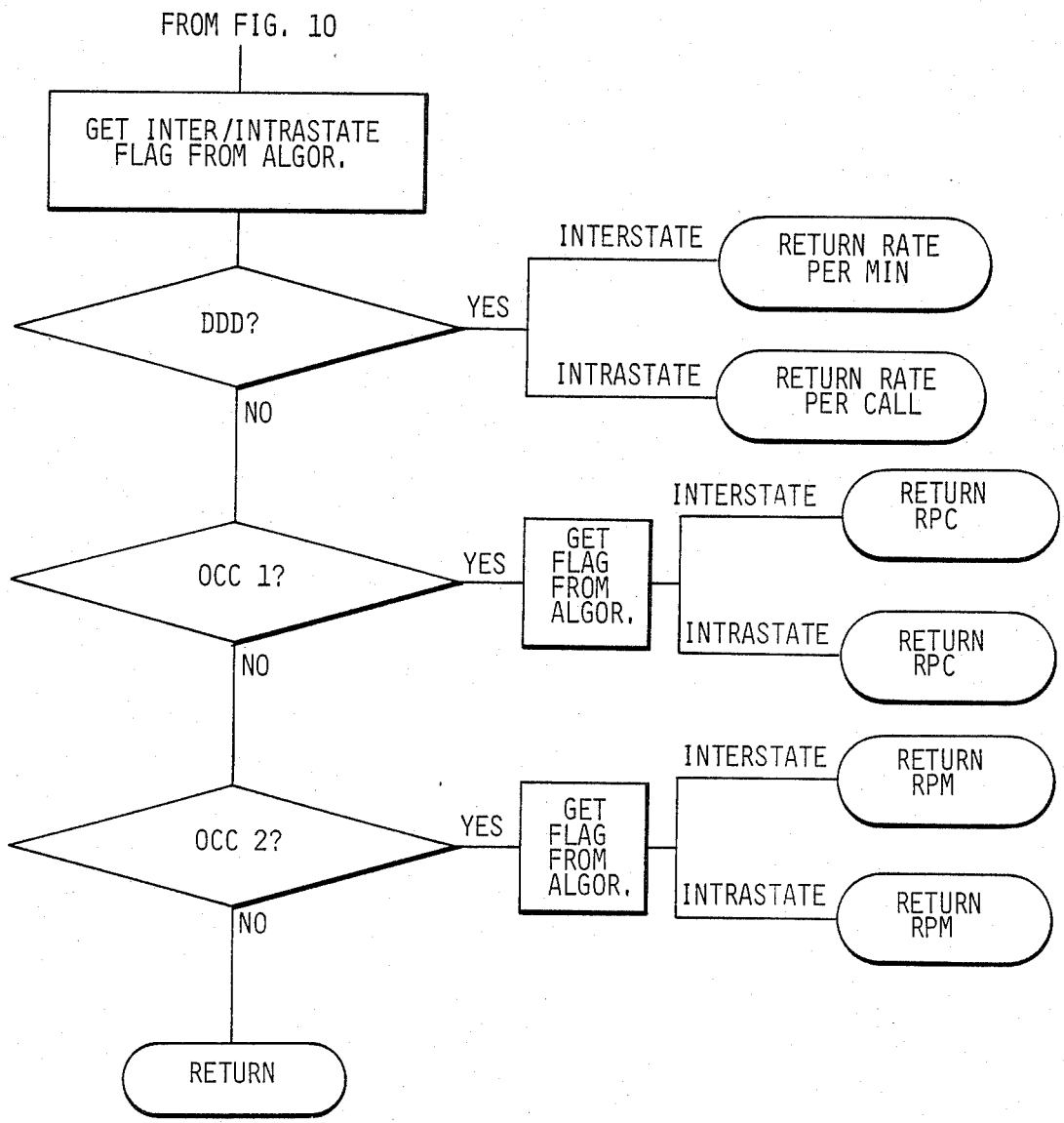

Attention is now directed to FIG. 10 wherein a flow chart of a typical program for costing the calls is depicted. The program first retrieves a pointer consisting of an address showing where the record is in memory for the particular call being costed and the type of service for that particular call is obtained, i.e. DDD, OCC, etc. The record for the particular call is then checked for accuracy of fields and information to determine whether they are valid. If the record is not valid, a flag is set to later identify the call for further inspection and control is returned to the main program. If the call record is valid, the type of the call is determined from a table. If a call type is invalid, control is returned to the main program. If the call type is DDD, it is first determined whether the particular area code and exchange number is active. If it is inactive, control is returned to the main program. However, if it is active, the program determines the time, date, and duration of the call following which a determination is made whether any fields in the call record are in error. If a field error is present, control is returned to the main program. Assuming there are no bad fields in the call record, the call is costed as indicated by the servie type for the trunk on which it was placed, i.e. DDD, WATS, OCC, TIE, FX, etc. From the foregoing, it is apparent that the telephone call accounting system described above not only provides for the reliable accomplishment of the objects of the invention but does so in a particularly inexpensive and effective manner. It is recognized, of course, that those skilled in the art may make various modifications or additions to the prefererrd embodiment chosen to illustrated the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

We claim:

1. A method of determining the cost of a telephone call made from a calling station having an area code and exchange number to a distantly located answering station having an area code and exchange number, comprising the steps of:
   (a) arranging the area codes and exchanges of the exchange system into an N×M matrix wherein N equals the area code numbers and M equals the exchange numbers, each combination of an area code number and an exchange number having a unique position in said matrix;
   (b) assigning a unique number to each of said positions in said matrix;
   (c) associating the position numbers with a plurality of respectively corresponding algorithms containing information relating to the distance between said stations;
   (d) selecting one of said algorithms using the position number of the answering station's area code and exchange number in said matrix;
   (e) storing call rate data related to the cost of placing calls between the calling station and a plurality of the answering stations; and
   (f) calculating said cost according to said one algorithm using the data stored in step (e).

2. The method of claim 1, wherein step (a) is performed by providing a memory having N×M storage locations and storing a single bit of data in those of said storage locations which correspond to an existing combination of an area code and exchange.

3. The method of claim 1, wherein step (c) is performed by storing a plurality of multi-bit data words in a plurality of corresponding storage locations in a memory, each of said storage locations being related to a corresponding one of said position numbers, and step (d) is performed by addressing said storage locations using data words corresponding to said position numbers.

4. For use with a telephone system of the type having a plurality of telephone sets each possessing a unique call number, said call number including a unique area code number associated with the area within which the telephone set is located and a unique exchange number associated with the location of the telephone set with said area, a method of costing telephone calls between one of said telephone sets and any of the remianing number of said telephone sets, comprising the steps of:
   (a) precomputing distances between said one telephone set and each of said remaining number of telephone sets;
   (b) storing data corresponding to each of said distances in a memory;
   (c) recalling from said memory the data corresponding to the distance between said one telephone set and a telephone set in said remaining number thereof to which a call is placed from said one telephone set; and
   (d) calculating the cost of said call using the distance recalled in step (c).

5. The method of claim 4, wherein step (b) includes the steps of:
   arranging the area codes and exchanges into an N×M matrix wherein N equals the number of area code numbers and M equals the number of exchange numbers, each combination of an area code number and an exchange number having a unique position in said matrix; and
   assigning a unique number to each of said positions in said matrix.

6. A method of costing telephone calls from any of a first plurality of telephone sets having one copmbination of an area code and exchange number to any of a second plurality of telephone sets having a different combination of an area code and exchange number, each combination of an area code and exchange number being associated with a unique geographic area, comprising the steps of:
   (a) precomputing distance from the geographic area associated with said one combination to the geographic area associated with each of the different combinations of area codes and exchange numbers; and (b) calculating the cost of the calls using the distances precomputed in step (a).

7. The method of claim 6, wherein step (a) includes substeps of arranging the different combinations of area codes and exchange numbers into bands of distances from said one combination and precomputing the distance from said one combination to each of said bands.

8. The method of claim 6, wherein step (a) is performed by:

providing an N×M bit storage matrix where N equals the exchange numbers of said different combination and M equals the area codes of said different combination the position of each bit in said matrix identifying a unique area code and exchange number combination;

selecting a particular bit in said matrix corresponding to the area code and exchange number being called;

identifying the position of said particular bit in said matrix; and selecting one of a plurality of algorithms for calculating said cost based on the position of said particular bit in said matrix.

9. The method of claim 8, wherein the identifying step is performed by counting a number of vertical and horizontal storage locations from the location of the particular bit to a reference point 10. The method of claim 8, wherein step (a) is performed by inserting a bit in each storage location in said matrix which corresponds to a working combination of an area code and exchange number and inserting a null value in each storage location in said matrix which corresponds to a nonworking combination of an area code and exchange number.

11. A system for costing telephone calls from any of a plurality of telephone sets having a particular combination of an area code and exchange number to any of a second plurality of telephone sets having other combinations of area codes and exchange numbers, wherein each combination of an area code and exchange number is associated with a unique geographic area and the cost of calls depends on a distance between the geographic areas, comprising:

a first memory including a plurality of storage locations arranged in an N×M matrix and in which bits of data are stored, each data bit being uniquely associated iwth one of said other combinations of area codes and exchange numbers, and wherein N equals the area code numbers and M equals the exchange numbers;

a second memory having a plurality of storage locations for respectively storing a plurality of multi-bit data words, each of said data words being uniquely associated with a position of one of said bits and defining an algorithm for determining the cost of the call; and a programmed computer including means for determining the position of each of said data bits in said first memory and means for calculating the cost of a call using the data word associated with the position of the data bit corresponding to the area code and exchange number being called.

12. The system of claim 11, wherein said first and second memories are defined on a bubble type memory device.

13. The system of claim 11, wherein said computer includes means for addressing said storage location using said positions determined by said position determining means.

* * * * *

UNITED STATES PATENT AND TRADEMARK OFFICE
CERTIFICATE OF CORRECTION

PATENT NO. : 4,525,601
DATED : June 25, 1985
INVENTOR(S) : Richard Barnich et al It is certified that error appears in the above-identified patent and that said Letters Patent is hereby corrected as shown below:

Patent is assigned to the Tel Data Group Limited Partnership, Troy, Michigan;

Abstract, Line 9, delete "combination" and insert --combinations--;

Column 1, line 7, delete "of" and insert --or--;

Column 1, line 41, delete "location" and insert --locations--;

Column 1, line 61, delete "almose, 4000,000" and insert --almost 400,000--;

Column 2, line 5, delete "of" and insert --or--;

Column 4, line 4, delete "is" and insert --in--;

Column 4, line 50, delete "of" and insert --or--;

Column 4, line 64, delete "bubles" and insert --bubbles--;

Column 4, line 48, insert --)-- before as--.

UNITED STATES PATENT AND TRADEMARK OFFICE
CERTIFICATE OF CORRECTION

PATENT NO. : 4,525,601
DATED : June 25, 1985
INVENTOR(S) : Richard Barnich et al It is certified that error appears in the above-identified patent and that said Letters Patent are hereby corrected as shown below:

Column 5, line 20, delete "therin" and insert --therein--;

Column 5, line 25, delete "ot" and insert --to--;

Column 5, line 48, delete "bits" and insert --bit--;

Column 6, line 4, delete "postion" and insert --position--;

Column 7, line 14, insert "data" between --BCD is--;

Column 7, line 40, delete "servie" and insert --service--;

Claim 4, Column 8, line 34, delete "remianing" and insert --remaining--;

Claim 6, Column 8, line 59, delete "copmbina-" and insert --combina--;

UNITED STATES PATENT AND TRADEMARK OFFICE
CERTIFICATE OF CORRECTION

PATENT NO. : 4,525,601
DATED : June 25, 1985
INVENTOR(S) : Richard Barnich et al It is certified that error appears in the above-identified patent and that said Letters Patent is hereby corrected as shown below:

Claim 6, Column 8, line 61, delete --different--; and

Claim 11, Column 10, line 13, delete "iwth" and insert --with--.

Signed and Sealed this

Fifteenth Day of April 1986

[SEAL]

Attest:

DONALD J. QUIGG

Attesting Officer

Commissioner of Patents and Trademarks